United States Patent
Berger et al.

(10) Patent No.: US 6,736,211 B2
(45) Date of Patent: May 18, 2004

(54) METHOD OF USING ALKYLSULFONATED PHENOL/ALDEHYDE RESINS AS ADSORPTION REDUCING AGENTS FOR CHEMICAL FLOODING

(75) Inventors: Paul D. Berger, Sugar Land, TX (US); Christie H. Berger, Sugar Land, TX (US)

(73) Assignee: Oil chem Technologies, Sugar Land, TX (US)

( * ) Notice: Subject to any disclaimer, the term of this patent is extended or adjusted under 35 U.S.C. 154(b) by 148 days.

(21) Appl. No.: 10/201,204

(22) Filed: Jul. 22, 2002

(65) Prior Publication Data

US 2004/0011526 A1 Jan. 22, 2004

(51) Int. Cl.⁷ .................................. E21B 43/22
(52) U.S. Cl. .................. 166/270.1; 166/275; 166/300; 166/371
(58) Field of Search ................ 166/270, 270.1, 166/270.2, 275, 300, 369, 371

(56) References Cited

U.S. PATENT DOCUMENTS

| | | |
|---|---|---|
| 2,454,542 A | 11/1948 | Book et al. |
| 3,039,529 A | 6/1962 | McKeon et al. |
| 3,437,141 A | 4/1969 | Brandner et al. |
| 3,726,850 A | 4/1973 | Detroit |
| 4,006,779 A | 2/1977 | Kalfoglou |
| 4,032,514 A | 6/1977 | Buriks et al. |
| 4,043,396 A | 8/1977 | Kudchadker et al. |
| 4,054,617 A | 10/1977 | Papalos et al. |
| 4,072,192 A | 2/1978 | Kudchadker et al. |
| 4,113,385 A | 9/1978 | Ford et al. |
| 4,117,031 A | 9/1978 | Macenka et al. |
| 4,142,582 A | 3/1979 | Kalfoglou |
| 4,172,497 A | 10/1979 | Kalfoglou |
| 4,172,498 A | 10/1979 | Kalfoglou |
| 4,196,777 A | 4/1980 | Kalfoglou |
| 4,219,082 A | 8/1980 | Kalfoglou |
| 4,235,290 A | 11/1980 | Kalfoglou |
| 4,236,579 A | 12/1980 | Kalfoglou |
| 4,249,606 A | 2/1981 | Kalfoglou |
| 4,337,828 A | 7/1982 | Blair, Jr. |
| 4,344,487 A | 8/1982 | Kalfoglou |
| 4,431,565 A | 2/1984 | Billenstein et al. |
| 4,444,262 A | 4/1984 | Haskin et al. |
| 4,452,308 A | 6/1984 | Haskin et al. |
| 4,467,869 A | 8/1984 | Gupta |
| 4,479,542 A | 10/1984 | Warchol et al. |
| 4,507,211 A | 3/1985 | Naylor et al. |
| 4,627,494 A | 12/1986 | Kalfoglou |
| 4,733,727 A | 3/1988 | Falls |
| 4,739,040 A | 4/1988 | Naae et al. |
| 4,973,764 A | 11/1990 | Oswald et al. |
| 4,982,789 A | 1/1991 | Prukop |
| 5,094,295 A | 3/1992 | Morrow |
| 5,095,985 A | 3/1992 | Naae et al. |
| 5,251,698 A | 10/1993 | Kalfoglou et al. |
| 5,252,698 A | 10/1993 | Bhardwaj et al. |
| 6,043,391 A | 3/2000 | Berger et al. |
| 6,269,881 B1 * | 8/2001 | Chou et al. ............... 166/270.1 |

* cited by examiner

Primary Examiner—Zakiya Walker

(57) ABSTRACT

A method of recovering oil or contaminants from subterranean reservoirs using a surfactant system where an adsorption reducing agent is injected before, after, and/or with the surfactant system. The adsorption reducing agent is formed by the reaction of an olefin sulfonic acid and phenol/aldehyde resin, the structure which is shown below where M may be Hydrogen or any cation, R is hydrogen, alkyl, alkenyl, etc., X is methylene or other aldehyde derived bridge, Y is hydrogen, ethylene oxide, propylene oxide, butylene oxide or mixtures of two or more of these, x+y is greater than 2 and n is equal or greater than 1.

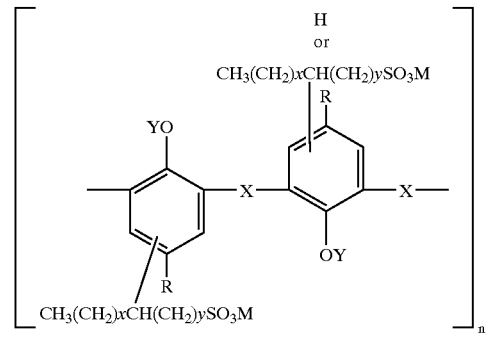

12 Claims, No Drawings

METHOD OF USING ALKYLSULFONATED PHENOL/ALDEHYDE RESINS AS ADSORPTION REDUCING AGENTS FOR CHEMICAL FLOODING

BACKGROUND OF THE INVENTION

This invention relates to the method of using alkylsulfonated phenol/aldehyde resins as adsorption reducing agents for chemical flooding and soil remediation. Many surfactants have been suggested and used to increase the production of oil from subterranean reservoirs and to increase the efficiency of removing contaminants from soil. These surfactants are used to mobilize, solubilize or emulsify the residual oil or contaminants or to help displace these with another liquid or gas. The surfactant may be adsorbed onto the solid surface in the process of liberating the residual oil or the contaminants due to electrostatic interactions between charged sites on the solid surface and the charged groups of the surfactants. For a thorough discussion of surfactant adsorption on various surfaces see Wesson and Harwell Chapter 4 in Surfactants Fundamentals and Applications in the Petroleum Industry, L. Schram ed. (2000).

The commonly used surfactants for recovering residual oil and contaminants are anionic, cationic, nonionic and/or amphoteric surfactants. The minerals that make up the subterranean formation containing the oil or contaminants are non-homogeneous. During chemical flooding, surfactant(s) and/or other chemicals are lost through strong interaction between the opposite charges of the surfactant(s) and the minerals of the formation. This reduces the effectiveness of the surfactant(s) and/or other chemicals and increases the cost of the chemical flood. Many suggestions have been presented to overcome this problem. These include using higher concentrations of surfactants or the use of sacrificial agents.

Sacrificial agents may be multi-charged high molecular weight molecules that are preferentially adsorbed on the surface and mask it from the surfactants, allowing less surfactant and/or other chemicals to be adsorbed and more efficient recovery of oil or contaminants.

Very early work on the use of sacrificial agents includes the use of aqueous pyridine solution, and employing mixtures of sodium carbonate and polyphosphates, as described in U.S. Pat. No. 3,437,141. Unmodified and modified lignosulfonates have been described in many patents and papers as sacrificial agents to reduce the adsorption of surfactants. U.S. Pat. No. 3,039,529 discloses the use of unmodified lignosulfonates as a preflush to condition formations and reduce surfactant adsorption. U.S. Pat. No. 3,726,850 describes the oxidation of the unmodified lignin sulfonate resulting in the formation of carboxyl groups and phenolic groups. U.S. Pat. Nos. 4,235,290, 4,236,579, 4,249,606 and 4,344,487 describe the reaction of modified lignosulfonates, and formaldehyde condensates of these as sacrificial agent. U.S. Pat. No. 4,072,192 reports the use of sulfomethylated lignite salt as a sacrificial agent in oil recovery. U.S. Pat. No. 4,133,385 uses oxidized lignosulfonates as sacrificial agents for oil recovery using surfactants. U.S. Pat. No. 4,172,497 describes the addition of methyl sulfonate groups to the ortho positions of aryl groups present in the oxidized lignosulfonate. U.S. Pat. No. 4,142,582 discloses the use of chrome lignosulfonates as sacrificial agents. U.S. Pat. No. 4,219,082 disclosed the use of lignosulfonate-formaldehyde condensation products as sacrificial agents. U.S. Pat. No. 4,479,542 describes the use of lignosulfonates as solubilizing agents in an afterflush. U.S. Pat. No. 4,627,494 discloses the use of lignosulfonate mixed with a starch or cellulose derivative as sacrificial agents. U.S. Pat. No. 5,252,698 uses lignosulfonate-acrylic graft co-polymers as sacrificial agents. U.S. Pat. No. 4,627,494 describes various lignosulfonate derivatives employed as sacrificial agents.

Many other patents and papers describe the use of different sacrificial agents to reduce the adsorption of chemicals onto formations. U.S. Pat. No. 4,172,498 describes the reaction of chloroacetic acid with hydroxyl and sulfonate groups on lignosulfonates to yield carboxylate sacrificial agents. U.S. Pat. No. 4,444,262 uses an amine in combination with surfactants, solubilizers, sulfonates and viscosity enhancers to prevent loss of injection chemicals. U.S. Pat. No. 4,452,308 uses low molecular weight polyalkylene glycols as sacrificial agents for surfactant flooding. U.S. Pat. No. 4,733,727 describes the use of an alkali metal carbonate or bicarbonate salt to reduce surfactant loss when displacing oil by carbon dioxide, water and surfactant. U.S. Pat. No. 4,043,396 describes the use of alkoxylated asphalt as a sacrificial agent in oil recovery. A paper by Hong and Baer published in SPE Reservoir Engineering, November (1990) p 467–473, discusses the successful field testing of these materials to reduce the adsorption of a petroleum sulfonate.

Many of the numerous patents that have been issued in the past that have proposed various sacrificial agents to reduce the adsorption of surfactant and/or other chemicals have limited use or have been superceded or abandoned because of higher concentration required, poorer performance in the field, higher cost, environmental concerns or limited applications. Our invention overcomes these shortcomings by providing a lower cost, more effective, easily manufactured product made from readily available raw material sources.

Our invention involves the use of alkylsulfonated phenol/aldehyde resins as sacrificial agents, also herein referred to as adsorption reducing agents. Alkylsulfonated phenol/aldehyde resins are formed by the reaction of an olefin sulfonic acid with the oligomer of phenol or a substituted phenol or any other condensable aromatic with formaldehyde or other aldehyde as described in U.S. Pat. No. 6,043,391. The phenol formaldehyde resin reactions are discussed in detail in *Phenolic Resins Chemistry, Applications and Performance Future Directions*, Knop and Pilato, pages 5–90. Alkylsulfonated phenol/aldehyde resins and their derivatives have been prepared for different applications such as demulsifiers or surfactants used in the oil field, but not in the application as adsorption reducing agents as our invention. U.S. Pat. No. 4,032,514 uses alkylphenol/aldehyde resins as demulsifiers for produced oil. U.S. Pat. No. 4,507,211 describes the use of alkylphenol ether propane sulfonate as a surface-active agent for the recovery of oil. U.S. Pat. No. 4,973,764 describes the alkylation of phenol and the preparation of alkoxylated, sulfoalkylated, phosphated products and their aldehyde condensation products. U.S. Pat. No. 5,095,985 describes the method of producing oil soluble surfactants from lignin and alkylphenol.

It is within the scope of our invention to use mixtures of phenol and substituted phenols. These are reacted with an aldehyde at elevated temperature using an acid or alkali catalyst. A solvent may be used to facilitate the reaction. Solvents commonly used include aromatic hydrocarbons. Other solvents may also be used as long as they dissolve or disperse the aldehyde and the phenol and do not participate in the reaction between the two. If an aromatic solvent is chosen in making the condensate, it will also react with the olefin sulfonic acid during alkyl sulfonation to form the corresponding alkylsulfonated aromatic. The resulting sulfonated phenol/aldehyde condensate, made with or without solvent, may then be formulated into a surfactant system to reduce the adsorption of the surfactant and/or other chemicals of that system onto the subterranean formation. The surfactant system is injected into subterranean formation through one or more injection wells and the oil or containments is recovered through one or more producing wells in a process that is well known to those familiar with the art. The components of the surfactant system may include one or more of the following: surfactants, co-surfactants, solubilizers, solvents, polymers and alkali.

BRIEF SUMMARY OF THE INVENTION

The primary objective of the invention is to provide a means of reducing or eliminating the loss of surfactant and/or other chemicals onto the subterranean formation through adsorption in chemical flooding or soil remediation process.

Another object of the invention is to reduce the amount of surfactant and/or other chemicals necessary to recover oil or contaminant. A further object of the invention is to provide an economical, effective and easily produced adsorption reducing compound from readily available, inexpensive raw material sources. Other objects and advantages of the present invention will become apparent from the following descriptions, wherein by way of illustration and example, an embodiment of the present invention is disclosed.

This invention in accordance with the preferred embodiment of the invention discloses a process for reducing the amount of surfactant and/or other chemicals, in a surfactant system, that are adsorbed onto a subterranean formation rock by preflushing, after flushing and/or admixing with, the surfactant system with an alkylsulfonated phenol/aldehyde resin. The surfactant system containing one or more of surfactant(s), solubilizer(s), solvent(s), polymer(s), alkali(s), through one or more injection wells and the oil or contaminants recovered through one or more producing wells.

present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

This invention encompass a method for the reduction of adsorption of surfactant and/or other chemicals from a surfactant flooding system by employing a phenol/aldehyde resin with alkyl sulfonate group(s) attached to one or more of the phenol rings. The phenol/aldehyde resin is made by the condensation of a phenol, alkylphenol or mixtures of both phenol and alkylphenol with an aldehyde. The synthesis of such products is well known to persons familiar with the art and has been described in many patents. A complete discussion of these products can also be found in *Phenolic Resins Chemistry, Applications and Performance Future Directions*, A. Knop and L. Plato Springer-Verlag (1985). Examples of phenols that may be used include various isomers of phenol, cresol and alkylphenols with 3 or more carbons comprising the alkyl chain, various isomers of xylenol, trimethylphenol, resorcinol, and bisphenol-A. Aldehydes used to couple the phenols together include formaldehyde, paraformaldehyde, trioxane, acetaldehyde, propionaldehyde, n-butyraldehyde, iso-butyraldehyde, glyoxal and furfural. These examples are for illustrative purpose and are not to be taken as all-inclusive.

The resin is alkylsulfonated by the addition of one or more moles of an olefin sulfonic acid by the methods described in U.S. Pat. No. 6,043,391 which is incorporated herein in its entirety by reference. The reaction of an alpha-olefin sulfonic acid (AOS acid) and an alkylphenol/formaldehyde resin is shown below where R is hydrogen, alkyl, alkenyl, etc., X is methylene or other aldehyde derived bridge, Y is hydrogen, ethylene oxide, propylene oxide, butylene oxide or mixtures of two or more of these, x+y is greater than 2, m is x+y−2 and n is greater or equal to 1.

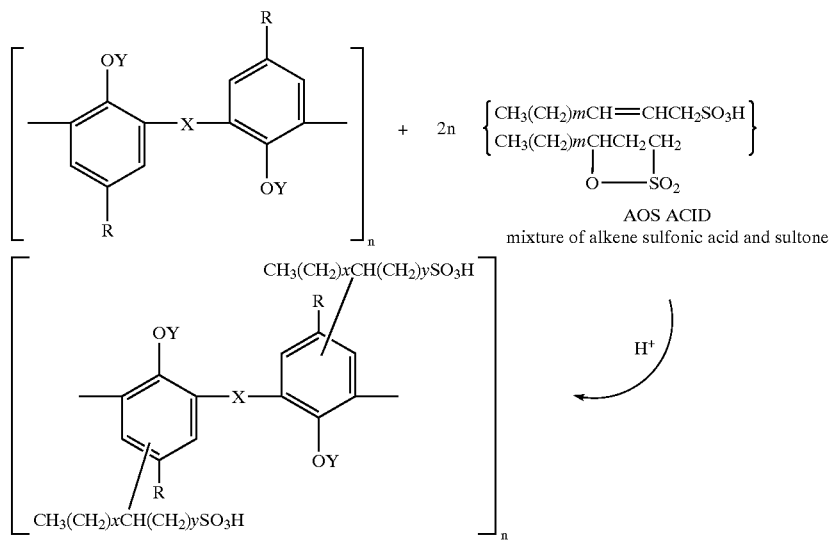

DETAILED DESCRIPTION OF THE PREFERRED EMBODIMENTS

Detailed descriptions of the preferred embodiment are provided herein. It is to be understood, however, that the The product of the above reaction may be neutralized with any mono, di or trivalent metal cation or an amine, or allowed to remain in its acid form. The general structure for the product resulting from the reaction of a condensed phenol/aldehyde resin and an olefin sulfonic acid gives the following structure where M may be H, any mono, di or trivalent cation, or an amine, R is hydrogen, alkyl, alkenyl, etc., X is methylene or other aldehyde derived bridge, Y is hydrogen, ethylene oxide, propylene oxide, butylene oxide or mixtures of two or more of these, x+y is greater than 2 and n is greater or equal to 1.

The backbone of the resin may contain repeating units of the same alkylphenol or a mixture of two or more alkylphenols and/or phenol itself. Not every phenol unit must contain an alkylsulfonate group. At least one of the phenols comprising the phenol backbone contains a pendent alkylsulfonate group, however, it is desirable that most of the phenols contain an alkylsulfonate group to impart a high charge density to the final composition.

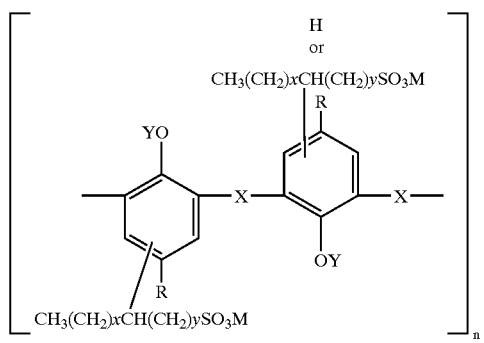

The free acid or neutralized alkylsulfonated phenol/aldehyde resin may be formulated along with surfactant(s), solubilizers(s), solvent(s), co-surfactant(s), alkali, and/or viscosity control agent(s) and injected downhole to recover oil or contaminants. A typical formulation would contain, but is not limited to, primary surfactant(s) such as sulfonates, sulfates, carboxylates, phosphates, oxyalkylated alkyl phenols, betaines, sulfobetaines and alkoxylated alcohols to give low interfacial tension between the injected solution and the residual crude oil or contaminant. Also the formulation may contain co-surfactants such as lower carbon number alcohols and glycols, glycol ethers, and solvents such as water, glycols, alcohols or glycol ethers. This formulation is then combined with injection water and optionally viscosity control agents such as polyacrylamides or xanthan gum and optionally alkali such as sodium hydroxide or sodium carbonate.

A typical formulation would be the following, all percentages by weight:

Formulation A

| | |
|---|---|
| 10–50% | alkylsulfonated phenol/aldehyde resin |
| 20–80% | primary surfactant(s) |
| 5–60% | co-surfactant(s) |
| 10–70% | solvent |

This formulation is then mixed with injection brine; optionally alkali and optionally viscosity control agent in the following proportions and injected downhole.

| | |
|---|---|
| 0.05–5.0% | formulation A |
| 0–1.0% | polymers or other viscosity control agent(s) |
| 0–2.0% | alkali |
| 93.0–99.95% | injection brine |

EXAMPLE 1

The following illustrates the preparation of a C14/16 alkylsulfonated nonylphenol/formaldehyde resin.

Preparation of Alkylphenol/Formaldehyde Resin:

To a 100 ml round-bottom, three-necked flask was added 66.0 grams (0.30 Moles) nonylphenol followed by 9.38 grams 96% paraformaldehyde (0.30 Moles). The mixture was heated to 80° C. with stirring until the paraformaldehyde all dispersed. Then a small nitrogen stream was bubbled through the solution while continuing stirring. Methane sulfonic acid (0.10 gram) was added and the reaction was held under reflux while stirring and purging with Nitrogen. An exotherm was observed and the temperature rose to 126° C. The mixture was allowed to cool to 110° C. and held at this temperature under reflux with stirring and Nitrogen purge for two hours. After two hours at 110° C. the temperature was raised to 160° C. and the distillate collected. After 2 hours at 160° C., 5.6 grams of distillate, identified as water by Karl Fisher titration, was collected. Theoretically 5.8 grams should have been recovered, 5.4 grams from the water of reaction and 0.4 gram from the paraformaldehyde. The amount of water actually recovered indicates the reaction to be about 96.5% complete. The reaction is shown below where R represents a C-9 alkyl group.

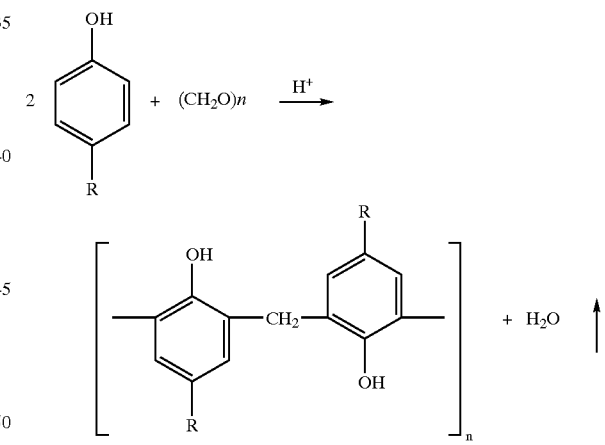

Prepartion of the Alkylsulfonated Alkylphenol/Formaldehyde Resin:

45.2 grams of the product from the above reaction was mixed with 58.0 grams of the acid obtained from the $SO_3$ sulfonation of C14/16 alpha-olefin where the ratio of C14 to C16 is about 40:60 by weight. The mixture was allowed to react at 130° C. and the sulfonate and sulfate concentration is analyzed every hour until no change was observed. After 6 hours at 130° C., the total sulfonate was 1.80 me/g and the sulfate was 0.06 me/g and remained constant for an additional hour at 130° C. Assuming an equivalent weight of 516 for the final product having a C14 or C16 alkyl sulfonic acid group attached to each nonylphenol ring, the theoretical total acidity should be 1.94 me/g. Thus, the reaction in this case is 95.8% complete. The structure of the final product isshown below where R=C9, R' is C14 or C16 alkyl terminated by an SO₃H group, and n=about 2 to about 8.

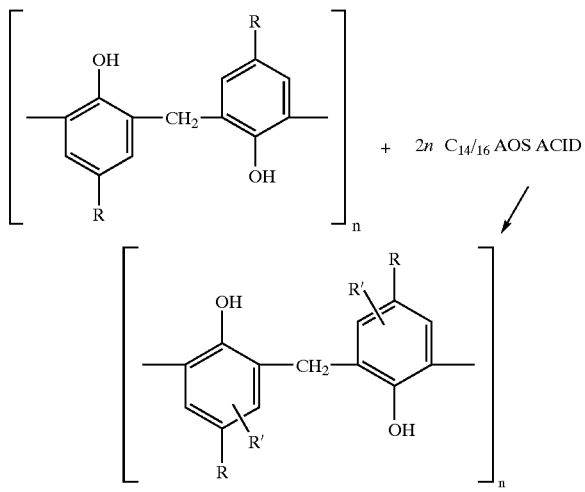

EXAMPLE 2

Absorption tests were conducted to determine the effectiveness of the final product from Example 1. These were conducted according to procedures well known to persons familiar with the art, for example, as revealed in SPE/DOE 35353 Al-Hasim et al. (1996). Surfactant samples are diluted to field strength with the brine to be used in the field. A 40.0-gram sample of this dilution is mixed with 10.0 grams of crushed reservoir sandstone from the field in a jar for 16 hours. The sample is filtered and the amount of surfactant adsorbed, usually reported as mg surfactant/gram rock is reported. Also the interfacial tension (IFT) of the brine against the reservoir oil, before and after the adsorption test, may also be measured as an indication of the amount of surfactant remaining.

A 0.50% by weight solution of SS-7066 in field brine was prepared. SS-7066 is an anionic surfactant based on sodium alkylarylsulfonate. It is 50% active with respect to sulfonate content, the sulfonate having an approximate Equivalent Weight of 400. 10.0 grams of crushed sandstone from the field under study was added to 40 grams of the 0.50% SS-7066 in field brine. This mixture of crushed reservoir sandstone and surfactant solution was shaken on a wrist shaker for 16 hours and then filtered through Whatman No. 4 filter paper. The anionic activity of the sample before and after the adsorption tests were determined using the CID Two-Phase Titration test with Hyamine as described in ASTM D3049-89. The adsorption of surfactant in milligrams per gram of rock was calculated as described in SPE/DOE 35353. The interfacial tension of the surfactant solution against the field crude oil at 31° C. was determined using a University of Texas Model 500 Spinning Drop Tensiometer. These tests were repeated using a 0.40% by weight of SS-7066 along with 0.10% by weight of the final product from Example 1. The results are reported in Table 1 below.

Table 1 shows that the alkylsulfonated nonylphenol/formaldehyde resin from Example 1 is extremely effective in reducing the adsorption of SS-7066 onto the formation rock. These results are supported by the very low IFT values obtained after the surfactant solution was contact with the rock for 16 hours when the alkylsulfonated nonylphenol/formaldehyde resin from Example 1 is included with the SS-7066. Similar results have been obtained using different brines, surfactants, oils, and alkylsulfonated nonylphenol/formaldehyde resins on both limestone and sandstone type rock.

TABLE 1

| Sample Description | Adsorption mg/gm rock | IFT, mN/m |
|---|---|---|
| 0.5% SS-7066 before adsorption test | — | 0.0065 |
| 0.5% SS-7066 after adsorption test | 20 | 0.0176 |
| 0.4% SS-7066 + 0.1% SA before adsorption test | — | 0.0072 |
| 0.4% 7066 + 0.1% SA after adsorption test | 0.03 | 0.0071 |

SA = Alkylsulfonated nonylphenol/formaldehyde resin from Example 1

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of using a surfactant system to recover oil from a subterranean formation which is penetrated by at least one injection well and at least one production well wherein the surfactant system contains about 0.005% to about 2.5% by weight of an adsorption reducing agent designed to reduce the loss of chemicals in the injected surfactant system onto the formation, said adsorption reducing agent comprising an alkylsulfonated phenol/aldehyde resin.

2. The method as set forth in claim 1 wherein the adsorption reducing agent is a condensed phenol having the following structure where M may be H, mono, di or trivalent cation, or an amine; R is hydrogen, alkyl, alkenyl; X is methylene or other aldehyde derived bridge; Y is hydrogen, ethylene oxide, propylene oxide, butylene oxide or mixtures of two or more of these; x+y is greater than 2, and n is greater or equal to 1.

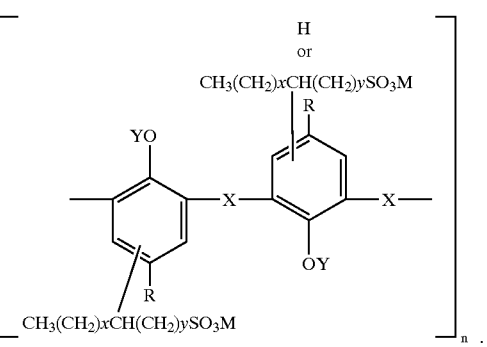

3. The method as set forth in claim 2 wherein said phenol is selected from the group phenol, o-alkylphenol, m-alkylphenol, p-alkylphenol, o-cresol, m-cresol, p-cresol, 2,3-xylenol, 2,4-xylenol, 2,5-xylenol, 3,1-xylenol, 3,4-xylenol, resorcinol, bisphenol-A.

4. The method as set forth in claim 3 wherein said alkylphenol is an alkylphenol with from C1 to about C30 carbons in the alkyl chain.

5. The method as set forth in claim 3 wherein said alkylphenol contains one or more selected from the group linear, branched, saturated, unsaturated alkyl chain.

6. The method as set forth in claim 2 wherein said aldehyde is selected from the group: formaldehyde, paraformaldehyde, trioxane, acetaldehyde, propionaldehyde, butyraldehyde, glyoxal, furfural.

7. The method as set forth in claim 1 wherein said chemicals in the injected surfactant system are selected from the group of surfactants, co-surfactants, solubilizers, solvents, polymers, alkalis.

8. The method as set forth in claim 1 wherein said alkylsulfonated phenol/aldehyde resin is derived from the reaction of a phenol/aldehyde resin and the acid resulting from the sulfonation of an olefin containing 5 to about 30 carbons.

9. The method of claim 1, wherein the adsorption reducing agent may be used in its acid, mono, di, tri-valent cations, or amine salt form.

10. The method of claim 1, wherein the adsorption reducing agent is co-injected into the formation with the surfactant system.

11. The method of claim 1, wherein the adsorption reducing agent is injected into the formation prior to the injection of the surfactant system.

12. The method of claim 1, wherein the adsorption reducing agent is injected into the formation after the injection of the surfactant system.

* * * * *